US006002475A

United States Patent [19]

Boyd et al.

[11] Patent Number: 6,002,475

[45] Date of Patent: Dec. 14, 1999

[54] SPECTROPHOTOMETRIC ANALYTICAL CARTRIDGE

[75] Inventors: Douglas E. Boyd, Dublin; Jan B. Yates, Reynoldsburg; Ronald Coleman, Columbus, all of Ohio; James Hutchison, Indianapolis; Richard Riedel, Carmel, both of Ind.

[73] Assignee: Careside, Inc., Culver City, Calif.

[21] Appl. No.: 09/014,558

[22] Filed: Jan. 28, 1998

[51] Int. Cl.[6] .......... G01N 1/10; G01N 21/01; G01N 1/38; G01N 35/10

[52] U.S. Cl. .......... 356/246; 356/244; 436/178; 436/45; 436/165; 436/174; 422/68.1; 422/72; 422/81; 422/100; 422/58; 422/101; 422/102

[58] Field of Search .......... 356/246, 244; 204/401, 411; 436/180, 164, 165, 45; 210/787, 782, 745, 789; 422/56, 61

[56] References Cited

U.S. PATENT DOCUMENTS

| | | | |
|---|---|---|---|
| 4,708,940 | 11/1987 | Yoshida et al. | 436/45 |
| 4,740,472 | 4/1988 | Burtis et al. | 436/63 |
| 4,788,154 | 11/1988 | Guigan | 436/180 |
| 4,814,144 | 3/1989 | Edelmann et al. | 422/102 |
| 4,883,763 | 11/1989 | Holen et al. | 436/45 |
| 4,940,527 | 7/1990 | Kazlauskas et al. | 204/401 |
| 4,963,498 | 10/1990 | Hillman et al. | 436/69 |
| 4,997,769 | 3/1991 | Lundsgaard | 356/39 |
| 5,061,381 | 10/1991 | Burd | 210/789 |
| 5,096,669 | 3/1992 | Lauks et al. | 422/61 |
| 5,122,284 | 6/1992 | Braynin et al. | 210/782 |
| 5,147,607 | 9/1992 | Mochida | 422/57 |
| 5,160,702 | 11/1992 | Kopf-Sill et al. | 422/72 |
| 5,171,533 | 12/1992 | Fine et al. | 422/72 |
| 5,186,844 | 2/1993 | Burd et al. | 210/782 |
| 5,242,606 | 9/1993 | Braynin et al. | 210/787 |
| 5,275,016 | 1/1994 | Chatterjee et al. | 62/381 |
| 5,286,454 | 2/1994 | Nilsson et al. | 422/102 |
| 5,288,463 | 2/1994 | Chemelli | 422/58 |
| 5,304,348 | 4/1994 | Burd et al. | 422/72 |
| 5,331,958 | 7/1994 | Oppenheimer | 356/39 |
| 5,399,486 | 3/1995 | Cathey et al. | 435/7.9 |
| 5,403,415 | 4/1995 | Schembri | 156/73.1 |
| 5,409,665 | 4/1995 | Burd | 422/64 |
| 5,413,732 | 5/1995 | Buhl et al. | 252/182.11 |
| 5,416,026 | 5/1995 | Davis | 436/66 |
| 5,427,915 | 6/1995 | Ribi et al. | 435/7.92 |
| 5,447,440 | 9/1995 | Davis et al. | 435/6 |
| 5,449,621 | 9/1995 | Klein | 436/45 |
| 5,457,053 | 10/1995 | Burd et al. | 436/45 |
| 5,472,603 | 12/1995 | Schembri | 210/380.1 |
| 5,472,671 | 12/1995 | Nilsson et al. | 422/102 |
| 5,478,750 | 12/1995 | Bernstein et al. | 436/164 |
| 5,500,187 | 3/1996 | Deoms et al. | 422/58 |
| 5,503,985 | 4/1996 | Cathey et al. | 435/7.9 |
| 5,589,399 | 12/1996 | Allen et al. | 436/169 |

FOREIGN PATENT DOCUMENTS

| | | | |
|---|---|---|---|
| 0 160 282 B1 | 1/1990 | European Pat. Off. | 21/7 |
| 0 397 424 A2 | 11/1990 | European Pat. Off. | 33/48 |
| 0 407 827 A2 | 1/1991 | European Pat. Off. | 33/53 |
| 0 430 248 A2 | 6/1991 | European Pat. Off. | 33/543 |
| 0 318 255 B1 | 4/1993 | European Pat. Off. | 21/3 |
| 0 381 501 B1 | 6/1994 | European Pat. Off. | 21/3 |
| 0 470 202 B1 | 6/1994 | European Pat. Off. | 21/3 |
| 0 482 721 B1 | 9/1995 | European Pat. Off. . | |
| 0 550 090 B1 | 9/1996 | European Pat. Off. . | |
| 82 06036 | 4/1982 | France . | |
| WO 90/13016 | 11/1990 | WIPO | 21/3 |
| WO/96/06354 | 2/1996 | WIPO | 33/543 |

*Primary Examiner*—Frank G. Font
*Assistant Examiner*—Roy M. Punnoose
*Attorney, Agent, or Firm*—Oppenheimer Wolff & Donnelly LLP

[57] ABSTRACT

An analytical cartridge adapted for use in analyzing fluids for spectrophotometry. The cartridge includes a plumbing system composed of the cuvette and various wells or chambers which are interconnected by passageways. After introduction into the cartridge, liquid samples are separated (if necessary) and transported to a cuvette utilizing a sequential application of centrifugal force followed by pressurization of the system. The cartridge may be used in a wide variety of spectrophotometric procedures to measure the concentration of a wide variety of constituents in fluids, including bodily fluids which contain liquid and solid components.

26 Claims, 7 Drawing Sheets

FIG. 8
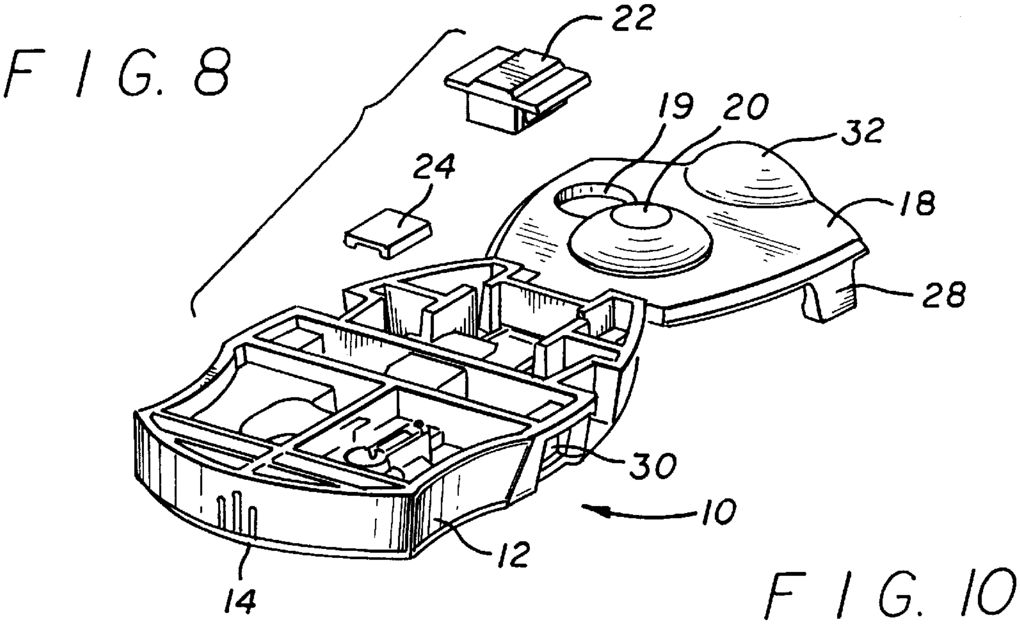
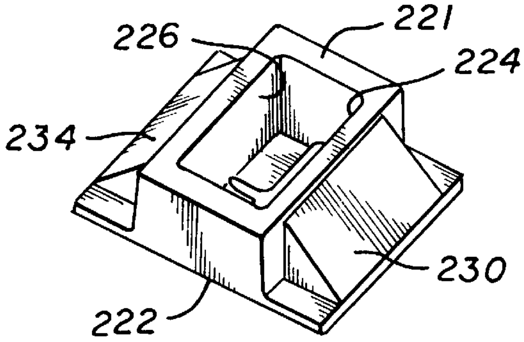
FIG. 9
FIG. 10
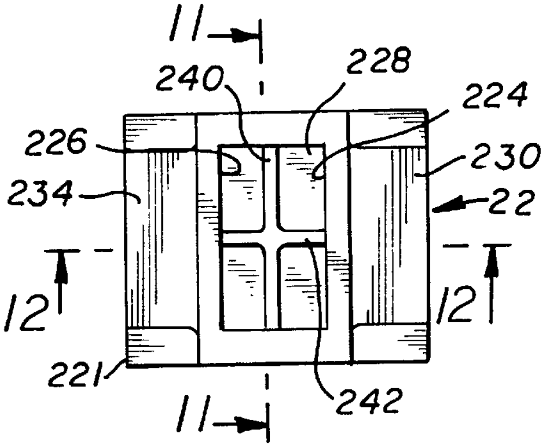
FIG. 12
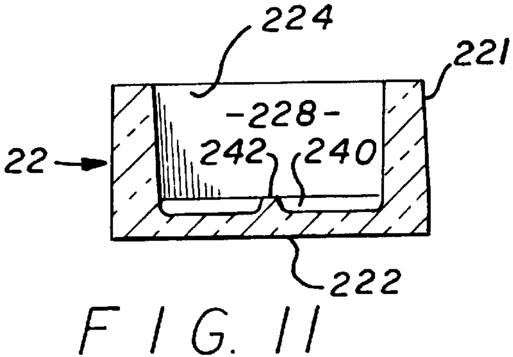
FIG. 11
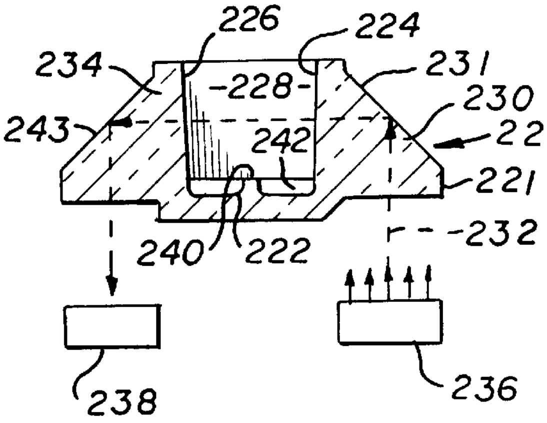

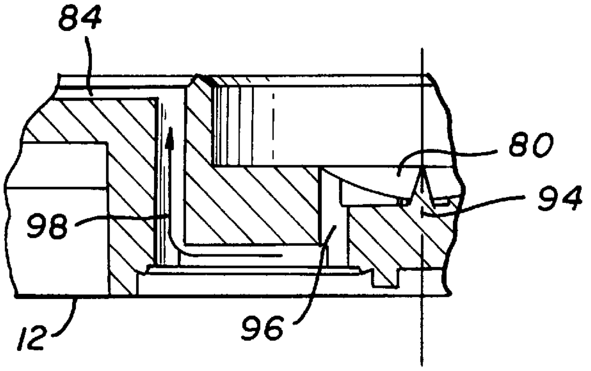
FIG. 13
FIG. 14
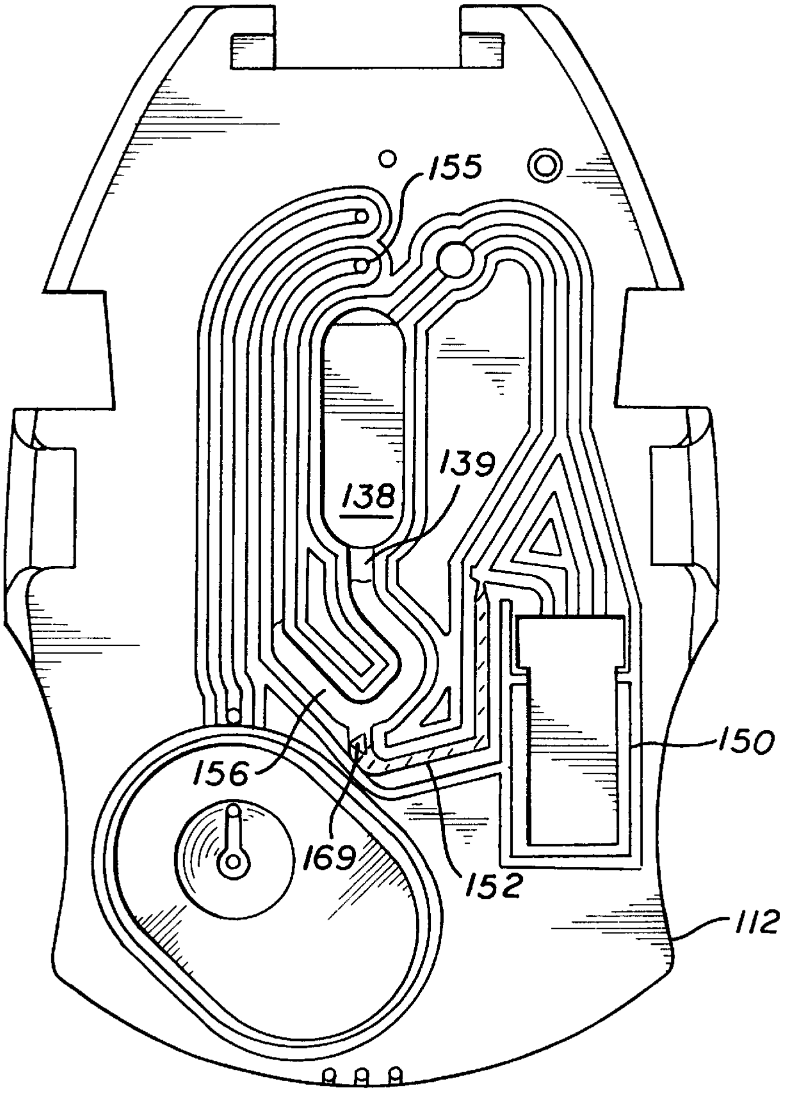

SPECTROPHOTOMETRIC ANALYTICAL CARTRIDGE

BACKGROUND OF THE INVENTION

1. Field of the Invention

The present invention relates generally to systems and methods which are used in spectrophotochemical analysis. More particularly, the present invention relates to spectrophotometric instruments and methods which are used to analyze fluids in a wide variety of laboratories including clinical laboratories and other healthcare facilities.

2. Description of the Related Art

Clinical chemistry involves the qualitative and quantitative analyses of body fluids, such as blood, urine, spinal fluid and other materials. Clinical chemistry encompasses multiple specialty testing areas including coagulation, hematology, immunochemistry, as well as chemistry. The test results derived from such analyses are used by physicians and other healthcare professionals to diagnose, monitor and treat diseases. The analysis protocols, instrumentation and other equipment utilized in clinical laboratory testing must be capable of providing accurate and repeatable test results. In addition, it is desirable that the procedures and instrumentation be simple and efficient. The testing equipment and procedures should be versatile enough that they can be used in healthcare locations where relatively few samples are tested as well as in larger clinical laboratories where the number of samples being tested on a daily basis is quite large.

A wide variety of analysis protocols are based on spectrophotometric analysis of the fluid being tested or the reaction product(s) of the fluid and one or more reagents. In a typical spectrophotometric analysis, the test fluid is introduced into a cuvette and radiation at one or more selected wavelengths is passed therethrough. The radiation absorption properties of the fluid are measured and may be used in both quantitative and qualitative determinations. In order to be useful in a clinical setting, an analytical system must be able to carry out spectrophotometric determinations.

Another consideration in designing analytical equipment for use by healthcare personnel is the amount of sample available for testing. In many situations, the amount of blood or other bodily fluid available is relatively small. Accordingly, there has been a trend in clinical chemistry to develop analytical systems which are capable of conducting numerous different chemical analyses on relatively small amounts of sample. In general, the goal has been to develop clinical analytical systems which provide the maximum number of medical tests utilizing the minimum amount of sample.

In achieving the above goals, a multitude of different analytical procedures and approaches have been investigated. In one approach, instruments have been developed which have a single sample introduction site. The equipment is designed so that the sample is split and routed to various locations within the system where multiple chemical analyses take place. Other systems do not include internal sample splitting devices and rely on the clinical chemist to separate the sample into small aliquots which are introduced into various instruments which are capable of conducting a maximum of only a few chemical analyses at one time.

There is a continuing need to develop and provide clinical chemistry equipment which is not only accurate, but versatile enough to meet the demands of modem medicine. The equipment should be simple enough to be used by not only highly-skilled laboratory technicians, but also by other healthcare personnel who may be required to conduct laboratory tests from time to time. The equipment and procedures should be versatile enough so that they can be utilized in clinical laboratories which analyze thousands of samples daily, while at the same time being adaptable to doctors' offices, home healthcare agencies and nursing homes where the number of tests being conducted is not as great. In addition, the equipment should be versatile enough to be useful in conducting a wide variety of blood analyses which are presently being routinely utilized. The equipment should also be adaptable to conducting blood or other bodily fluid tests which will be developed in the future.

SUMMARY OF THE INVENTION

In accordance with the present invention, an analytical cartridge is provided which can be used in a centrifuge-based system for conducting spectrophotometric analysis of a wide variety of fluids including biological fluids. The analytical cartridge is especially adapted for analyzing fluids, such as blood, which contain both liquid and solid components. The cartridge includes a cuvette that is adapted to be used in a wide variety of clinical tests including a multitude of chemistry, coagulation and immunochemistry tests.

The analytical cartridge in accordance with the present invention is composed of a housing which includes a cartridge body having a top surface, bottom surface and outer walls defining a housing perimeter. The cartridge body further includes an inner end and an outer end. Within the housing body is located a deposition well which is designed to receive fluids, such as blood and other bodily fluids, which may contain liquid and solid components. The cartridge may include a separation well located at a position which is more towards the outer end of the cartridge body than the deposition well. An overflow well is also located in the cartridge body at a position which is more towards the outer end of the cartridge body than the deposition well. A test well which includes a cuvette in accordance with the present invention is also located in the cartridge body. The inlet into the test well is located at a position which is more towards the inner end of the cartridge body than the deposition well.

A first passageway is provided to connect the deposition well to the overflow well. When needed to remove solids from the fluid, the separation well is incorporated as part of the first passageway. A second passageway connects the deposition well to the test well which houses the cuvette. The first and second passageways are integral with each other as they leave the deposition well and share the same pathway. A pressurization device is included to provide selective pressurization of the deposition well to provide controlled movement of liquid within the cartridge body. During operation, blood or other liquid which may contain solid components is introduced into the deposition well. The analytical cartridge is then centrifuged or otherwise subjected to centrifugal force which moves the fluid from the deposition well into the first and second passageways and the overflow well, if necessary. During the centrifugation, the fluid is separated, if necessary, into solid components located in the separation well and substantially solids-free sample liquid located in the second passageway and the common portion of the first and second passageways. Once centrifuging is complete, the test well is pressurized to provide flow of the sample liquid into the cuvette located in the test well. Once in the cuvette, the liquid is tested utilizing conventional spectrophotometric procedures.

As an additional feature of the present invention, a cuvette is provided which is especially well-suited for use as part of the analytical cartridge. The cuvette includes a cuvette body having a bottom, a first wall and a second wall which define the cuvette cell. The first and second walls include zones which are transparent to the required wavelengths of radiation. The walls are oriented substantially perpendicular to the cuvette body bottom. The cuvette further includes a first wing extending from the first wall of the cuvette body for receiving incident radiation which is directed substantially parallel to the first wall. The first wing is shaped to direct the incident radiation through the transparent zone in the first wall to form a test beam of radiation within the cell. A second wing extending from the second wall on the other side of the cuvette is designed to receive the test beam of radiation which has passed through the cell and the transparent zone in the second wall. The second wing is shaped to direct the test beam of radiation in a direction which is substantially parallel to the second wall and in a direction which is opposite to the incident radiation. This cuvette configuration, and its location within the analytical cartridge, allow simple and efficient spectrophotometric measurements to be made.

As a further feature of the present invention, a reagent well is provided within the cartridge body for housing a liquid reagent. A reagent passageway connects the reagent well to the test well. A pressurization device associated with the reagent well is utilized to provide controlled movement of reagent from the reagent well to the test well. The ability to add reagents directly to the cuvette located within the test well greatly increases the number and type of spectrophotometric analyses which can be carried out using the cartridge of the present invention.

The analytical cartridge in accordance with the present invention is well-suited for use in a wide variety of clinical settings. Numerous different spectrophotometric analyses may be carried out utilizing the cartridge by merely modifying the number and type of reagents which are either preloaded into the cuvette or added to the cuvette from one or more reagent wells. This allows the healthcare personnel to conduct a wide variety of different analyses on a given sample by selecting the appropriate cartridges.

The above described and many other features and attendant advantages of the present invention will become better understood by reference to the following detailed description when taken in conjunction with the accompanying drawings.

BRIEF DESCRIPTION OF THE DRAWINGS

FIG. 8 is a body perspective view of the preferred analytical cartridge showing the cuvette displaced away from its location within the cartridge body.

FIG. 9 is a perspective view of a preferred exemplary cuvette in accordance with the present invention.

FIG. 10 is a top view of the cuvette shown in FIG. 9.

FIG. 11 is a sectional view of FIG. 10 taken in the 11—11 plane.

FIG. 12 is a sectional view of FIG. 10 taken in the 12—12 plane.

FIG. 13 is a detailed view of a portion of the reagent well in accordance with the present invention. FIG. 13 also shows a portion of the passageway leading from the reagent well to the test well (cuvette).

FIG. 14 is a view of an embodiment of the present invention which does not have a separation well.

DETAILED DESCRIPTION OF THE INVENTION

Figure 1:
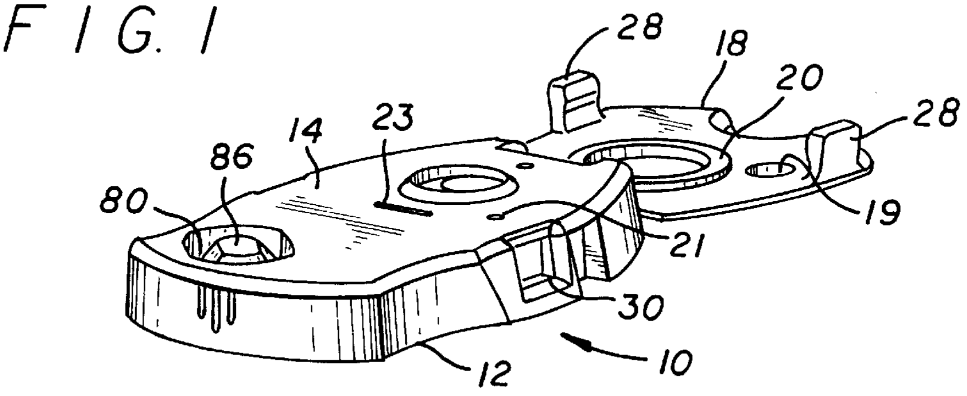
FIG. 1 is a perspective view of a preferred exemplary analytical cartridge in accordance with the present invention showing the cap which contains the flexible septum for pressurizing the deposition well in an open position.
Figure 2:
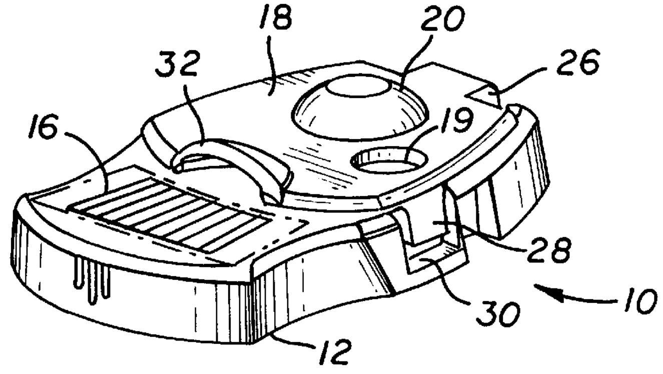
FIG. 2 is the same perspective view of the cartridge shown in FIG. 1 showing the lid in a closed position.
Figure 3:
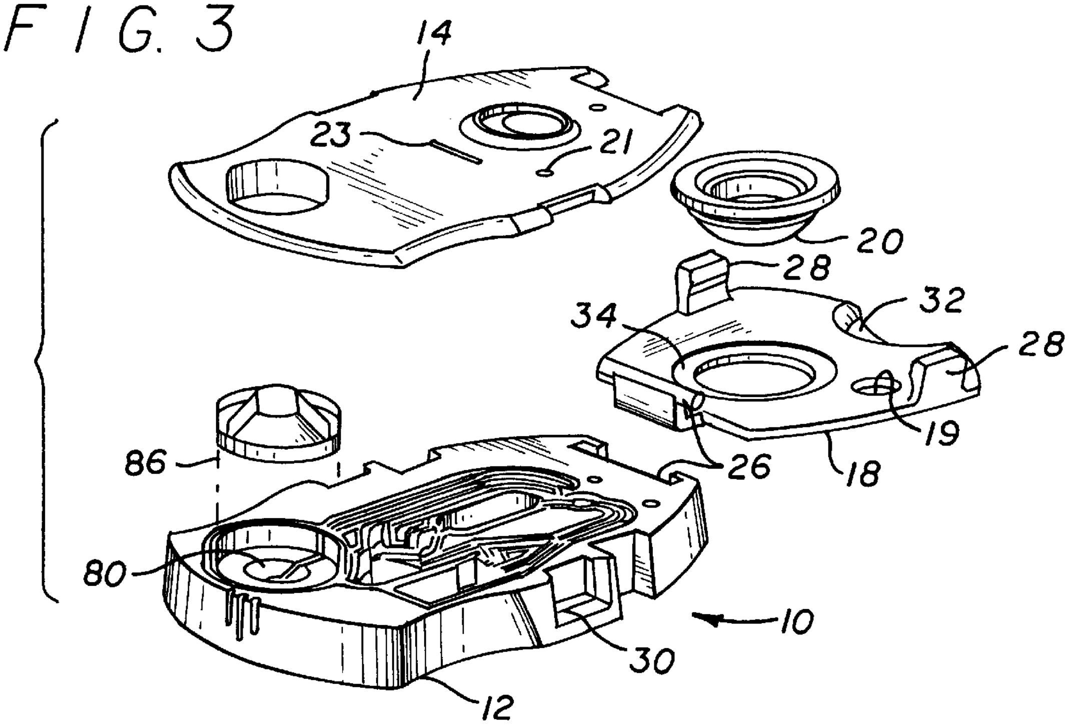
FIG. 3 is an exploded view of the preferred exemplary analytical cartridge in accordance with the present invention.

A preferred exemplary analytical cartridge in accordance with the present invention is shown generally at 10 in FIGS. 1–3 and 8. The cartridge 10 is made up of a housing which includes a cartridge body 12, top plate 14 and label 16. The analytical cartridge 10 further includes a hinged cap 18, flexible septum 20, cuvette 22, and retainer plate 24. In FIG. 1, the analytical cartridge 10 is shown with the hinged cap 18 in the open position. In FIG. 2, the hinged cap 18 is shown in the closed position. As best shown in FIGS. 2 and 3, the cap 18 is preferably hinged to the cartridge body 12 as shown at 26. The cap 18 includes locking tabs 28 which are designed to releasably engage indentations 30 in the cartridge body 12. The cap 18 preferably includes a curved portion 32 which provides access under the cap 18 so that it can be easily opened and closed. The cap 18 and top plate 14 have vent holes 19 and 21, respectively. The cartridge body 12 and top plate 14 are preferably made from a suitable plastic, such as polystyrene, polyvinylchloride, polycarbonate, or any other plastic which is rigid and inert with respect to biological fluids. Hinged cap 18 is preferably made from a suitable plastic, such as polypropylene or polyethylene or any other plastic which is flexible and inert with respect to biological fluids.

The septum 20 is shaped to fit within opening 34 in the cap 18 (FIG. 3). The septum 20 must be shaped to provide a sealing engagement with the cap 18 and top plate 14 so that depression of the septum 20 when the cap 18 is closed onto the top plate 14 results in pressure being applied to the cartridge body as will be described in more detail below. The septum 20 is made from an elastomeric material such as silicone rubber or any other elastomeric material that is inert with respect to biological fluids. The label 16 is optional and may be made from any of the well-known label materials conventionally used to allow writing onto laboratory equipment. Preferably, the label will be of the self-adhesive variety. The label 16 will preferably include an identification of the cartridge test chemistry along with instructions or other notes, such as a bar code, relevant to the specific test protocol.

Figure 4:
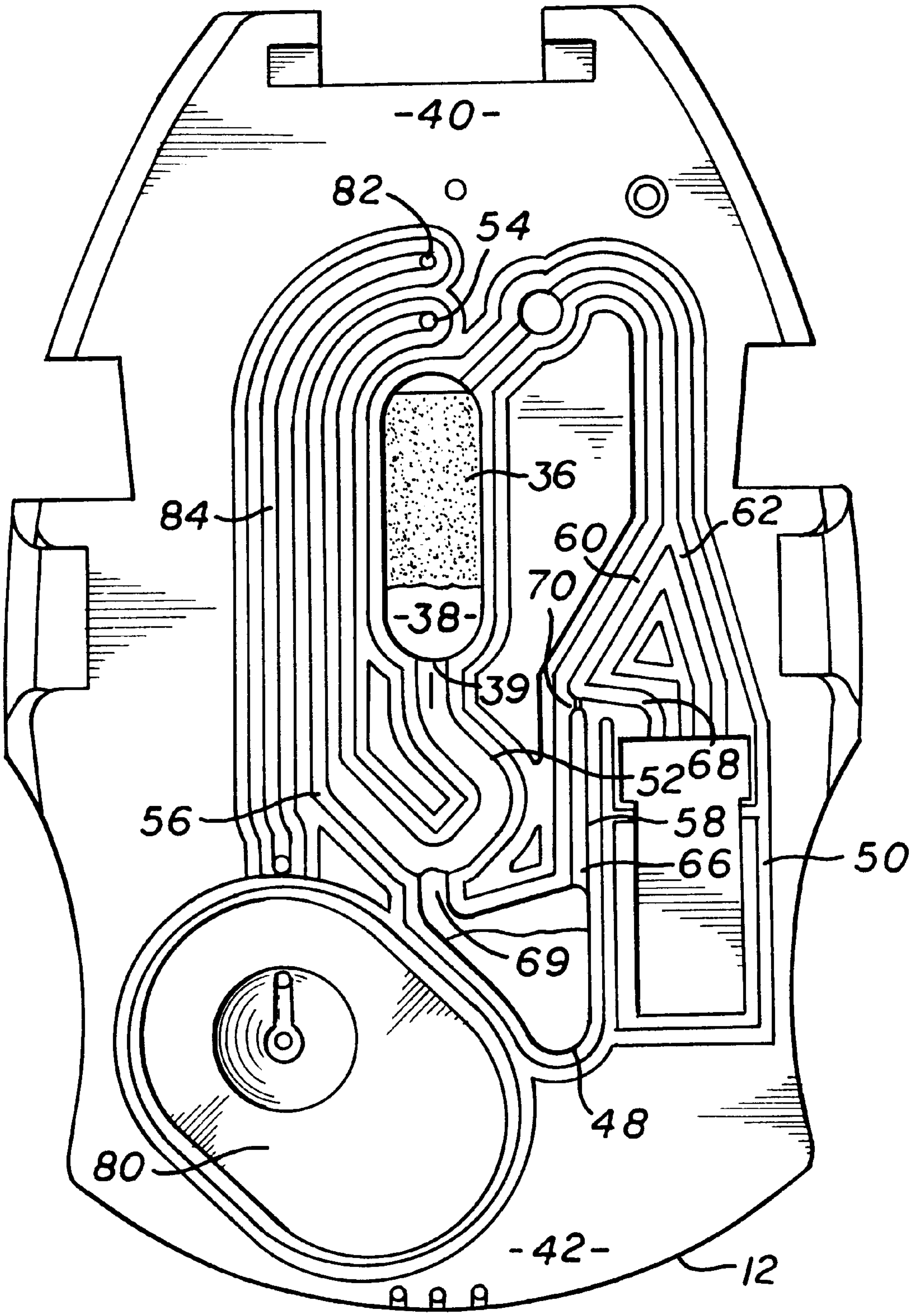
FIG. 4 is a top view of the cartridge body depicting the first step of a preferred analytical procedure wherein a blood sample has been introduced into the deposition well.

FIGS. 4–7 are top views of the cartridge body 12 showing a preferred exemplary test cartridge at various states during the testing procedure. Referring to FIG. 4, the test cartridge 12 is shown during the first step of the analytical process where a blood sample 36 is located in deposition well 38. The cartridge body 12, as shown in FIG. 4, has an inner end 40 and an outer end 42. After the blood sample 36 has been deposited in deposition well 38, the cartridge cap 18 is closed and the cartridge is placed in a centrifuge or other apparatus which is capable of causing the blood sample 36 to be transferred towards the outer end 42 as indicated by arrow 44 (see FIG. 5). Preferably, the centrifuge apparatus will be designed to house multiple cartridges which can be centrifuged simultaneously.

The top plate 14 includes a window 23 which provides visual access to the deposition well 38. The window 23 may be clear or opaque. If opaque, the window 23 must be sufficiently transparent to allow one to visually assess the contents of the deposition well 38. The window 23 is preferably in the shape of a narrow strip as shown in FIGS. 1 and 3. The window strip 23 is positioned so that blood or other sample only becomes visible when the required amount of sample has been deposited into the well 38. The window 23 allows the operator to quickly and accurately verify that the appropriate amount of sample has been deposited. Other types of detection systems may be used to verify filling of the deposition well. However, the use of a window, such as the window strip 23, is preferred due to its simplicity.

Figure 5:
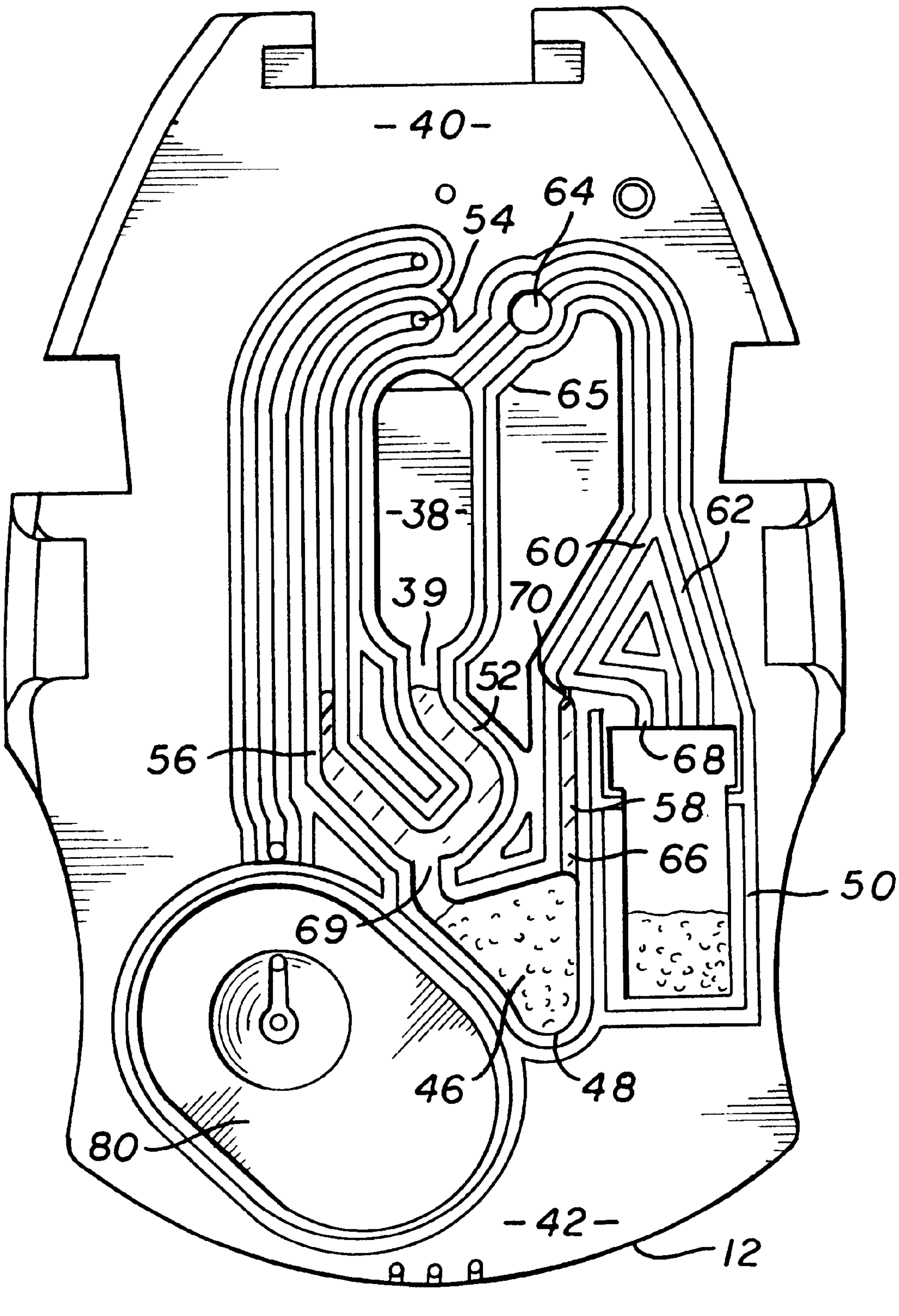
FIG. 5 depicts the cartridge body after it has been subjected to centrifugation in order to concentrate the red and white blood cells in the separation well and overflow well.

As shown in FIG. 5 (arrow 44), sufficient centrifugal force is applied to the cartridge 10 to ensure that the blood cells as shown at 46 are concentrated in separation well 48. The size of the deposition well 38 is chosen to allow deposition of an excess of sample. As a result, an overflow well 50 is provided. A detector may be provided to detect when fluid reaches the overflow well 50. The detector is provided to ensure that adequate sample has been introduced into the cartridge. The detector is preferably connected to a control system which nullifies the test if sufficient sample is not initially loaded into the cartridge to provide flow into the overflow well 50 as measured by the detector. The detector can be a simple visual detector like the window strip 23 described above. The detector could also be a more complicated system utilized detector electrodes or the like to provide an electronic signal when fluid reaches the overflow well 50.

As shown in FIGS. 4–7, the deposition well 38 is connected to the separation well 48 by inlet passageway 52. The separation well 48 and inlet passageway 52 are connected to test well inlet 54 by way of outlet passageway 56. Also, the separation well 48 is connected to the overflow well 50 by way of overflow passageway 58. Vent passageways 60 and 62 are connected to vent opening 21 in top plate 14 to allow liquids to be transferred through the various passageways to the various wells without the build-up of back pressure. Vent passageway 62 is connected to the deposition well 38 by way of a capillary break zone 64 and vent leg 65. The capillary break zone 64 is designed to prevent inadvertent capillary flow of fluid from the deposition well 38 through passageway 62. The particular shape of capillary break zone 64 is not critical provided that there is a sufficient increase in relative opening size between capillary break zone 64 and the vent leg 65 to prevent capillary action from transporting fluid from the vent leg 65 to the vent passageway 62. The inlet passageway 52 in combination with the separation well 48 and overflow passageway 58 make up a first passageway which connects the deposition well 38 to the overflow well 50. The inlet passageway 52, in combination with the outlet passageway 56 forms a second passageway which connects the deposition well 38 to the test well inlet 54. As can be seen from FIGS. 4–7, the first and second passageways are integral with each at the deposition well outlet 39. The two passageways remain integral with each other until they separate at point 69.

As shown in FIG. 5, centrifuging of the analytical cartridge 10 results in the separation of the blood plasma from a solid or cellular component located in separation well 48 and any overflow located in overflow well 50. Substantially solids-free plasma remains in portions of the outlet passageway 56, inlet passageway 52, and overflow passageway 58 as shown in the shaded portions in FIG. 5. The force at which the cartridge 10 is centrifuged, as well as the time, may be varied depending upon a number of different criteria. For example, in many situations it is neither necessary nor desirable to separate cells or other components from the sample fluid. In these cases, the centrifuge time and/or force are kept at sufficiently low levels to provide flow of fluid into the passageways and separation well, as described above, without separating the solid components from the fluid. The result is an accurately metered substantially homogeneous sample.

In those situations where it is not necessary to separate solids from the sample, the separation well 48 may be deleted from the cartridge as shown in FIG. 14. In FIG. 14, the cartridge body 112 includes a deposition well 138 and an overflow well 150. In this configuration, a first passageway 152 connects the deposition well outlet 139 directly to the overflow well 150. A second passageway 156 connects the deposition well outlet 139 to the inlet 155 for the test well/cuvette. The first and second passageways 152 and 156, respectively, are integral with each other at the deposition well outlet 139 and share the same conduit until they diverge from each other at the location shown by arrow 169. The cross sectional area of the first and second passageways above the point 169 is selected to provide containment of an accurate dosage of sample.

The optimum centrifuge force and time can be determined by routine experimentation as is well known in the art. The centrifuge load should be on the order of 200 to 400 g's with centrifuge times ranging from about 1 to 10 minutes and a time to speed of less than 3 or 4 seconds. When cell separation and removal is desired, the centrifuge parameters are chosen so that substantially all of the cellular components of the blood are separated out, leaving a substantially solids-free liquid located in the passageways as shown in FIG. 5. In situations where the sample is to be metered only and not separated, it is preferred to keep the centrifuge load relatively high. Separation is prevented from occurring by substantially reducing the centrifuge time.

Referring again to FIG. 5, the amount of substantially solids-free liquid which remains in the inlet passageway 52 and outlet passageway 56 is determined by the sizes of passageways 52 and 56 and the configuration of overflow passageway 58. The overflow passageway 58 is preferably composed of a separation well segment 66 and an overflow well segment 68. The separation well segment 66 includes a first end that is connected to the separation well 48 and a second end which is connected to the overflow well segment 68. The overflow well segment 68 has a first end which is connected to the separation well segment 66 and a second end which is connected to the overflow well 50. The separation well segment 66 forms an upstream passageway in the overflow passageway 58 which has a restriction 70 at its downstream or second end. The restriction 70 has a cross-sectional area which is substantially smaller than the cross sectional area of the downstream passageway or overflow well segment 68 at its first end which is connected to the separation well segment 66. This reduction in cross-sectional area is required to ensure that capillary action does not adversely affect the metering process and aliquotting of liquid in the inlet passageway 52 and outlet passageway 56. This configuration is preferred in order to provide a break in possible unwanted capillary action within the various passageways and wells. It is also preferred that the connection between the separation well segment 66 and overflow well segment 68 be vertically offset. Other configurations are possible provided that relative changes in cross-sectional areas and the orientation of the connection point between the upstream and downstream portions of the overflow passageway 58 are such that capillary induced flow is prevented.

Preferably, the reduction in cross-sectional area shown in constriction 70 in FIGS. 4–7 will occur adjacent to the connection with the overflow well segment 68. Preferably, the separation well segment 66 will be a channel having widths of between 0.7 and 1.1 mm and depths of between 0.1 and 0.2 mm. The constriction 70 will have widths on the order of 0.3 to 0.5 mm and depths on the order of 0.1 to 0.2 mm. The overflow well segment 68 and the remainder of the various passageways are preferably channels also having the above widths, but depths on the order of 0.5 and 1.5 mm. It is particularly preferred that the channel dimensions for the passageways (inlet passageway 52 and outlet passageway 56) both be on the order of 1.5 mm wide by 1.5 mm deep. It is particularly preferred that the overflow passageway 58 and the ventline 60 and 62 all be on the order of 0.8 mm wide by 1.1 mm deep. The preferred dimensions for the constriction 70 is 0.4 mm wide by 0.1 mm deep. Passageways having cross-sectional configurations other than square or rectangular channels are possible.

Figure 6:
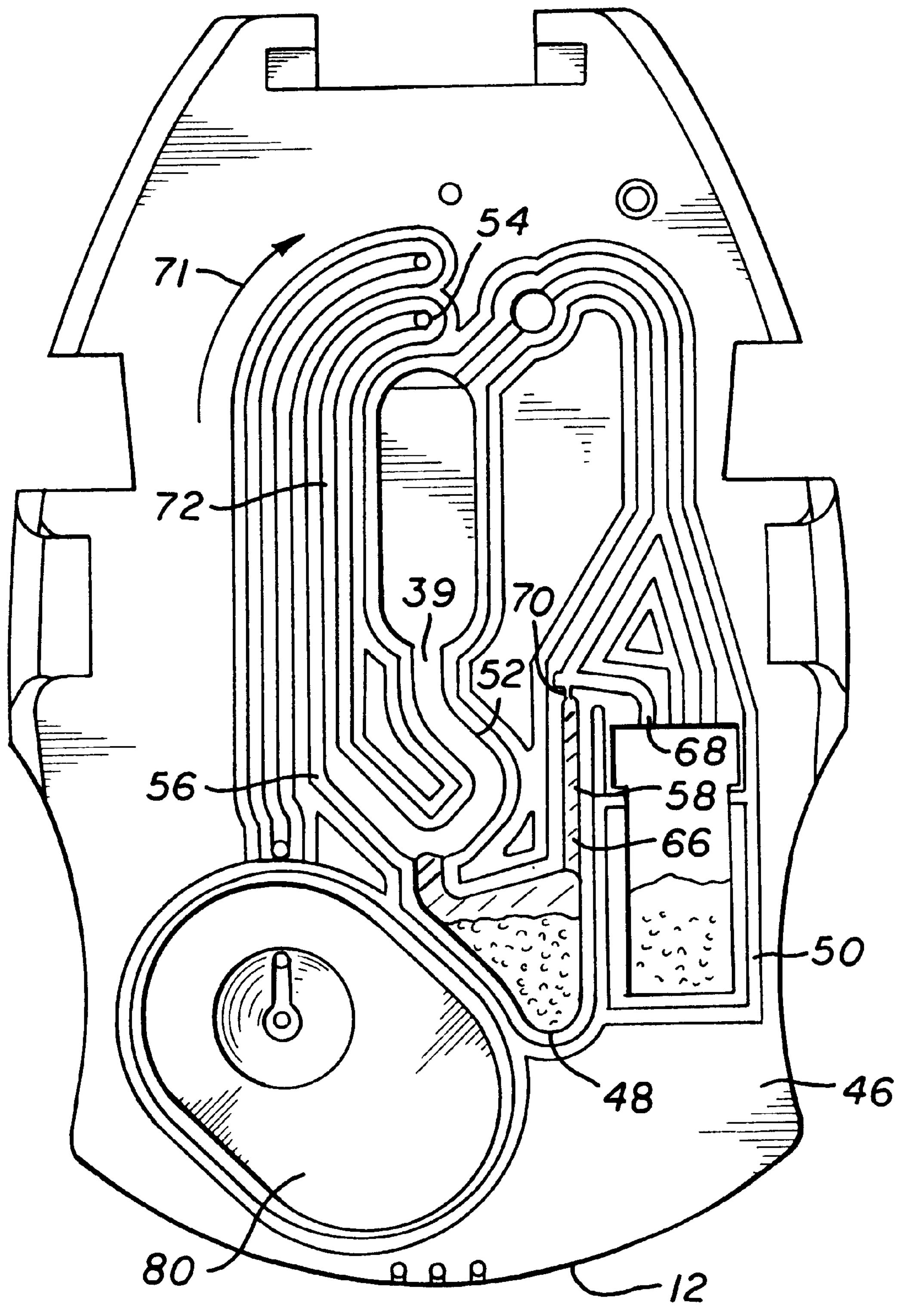
FIG. 6 is a view of the cartridge body depicting the transfer of sample fluid to the test well during pressurization of the deposition well.

After completion of the centrifuging step, the substantially solids-free liquid located in the inlet passageway 52 and outlet passageway 56 are transported through the outlet passageway 56 as represented by arrow 71 in FIG. 6. The liquid as shown at 72 is forced towards the test well inlet 54 by pressure which is applied to deposition well 38 by compressing septum 20. Although it is possible to move liquid 72 into the test well inlet 54 by pressing septum 20 by hand, it is preferred that an automatic system be utilized wherein multiple cartridges 10 are centrifuged simultaneously and then an apparatus be provided which automatically presses down on septum 20 to provide desired pressurization of deposition well 38 to force the liquid 72 into test well/cuvette via inlet 54. The vent 21 in the cover 14 must be sealed when the system is pressurized using septum 20.

The test well inlet 54 provides an inlet into the cuvette 22 which is heat sealed or otherwise bonded into the cartridge body. Although other components may form part of the test well, in this preferred embodiment, the test well is the cuvette. As best shown in FIGS. 9–12, the cuvette 22 includes a cuvette body 221 which has a bottom 222, a first wall 224 and a second wall 226 which define a cell 228. The cuvette further includes a first wing 230 which extends from the first wall 224. In the preferred embodiment, the first wing 230 is solid plastic or glass which is transparent to the radiation being used in the spectroscopic analysis. As best shown in FIG. 12, the first wing 230 has a reflective face 231 which is shaped so that radiation (as represented by phantom line 232) is directed into the cell 228. A second wing 234 extends from the second wall 226 and has a reflective face 243 which is shaped to provide redirection of the radiation beam back in the opposite direction. This configuration for cuvette 22 allows an incident beam of radiation to be applied to the cuvette in a direction which is substantially parallel to the first wall 224, with the radiation beam directed through the cuvette cell 228 by first wing 230 and then being directed by second wing 234 in a direction which again is substantially parallel to the first wall 224 and second wall 226, but in a direction which is opposite from the incident beam of radiation. In this way, both the radiation source and radiation detector can be located below the cuvette and cartridge assembly. The radiation source and detector are shown schematically in FIG. 12 at 236 and 238, respectively. Location of the radiation source 236 and detector 238 below the cuvette and cartridge assembly is an important feature since it allows spectrophotometric determinations to be conducted while the cartridge assemblies are housed in a centrifuge tray or other assembly. Such determinations can be made while the cartridge is stationary or during rotation.

The cuvette 22 can be made from a wide variety of materials provided that they are optically transparent for the radiation being used in the test protocol. For example, cuvettes made from optical quality plastics may be used when visible or ultraviolet determinations are being made. When infrared radiation is being used, it is preferred that the cuvette be made from glass.

Figure 7:
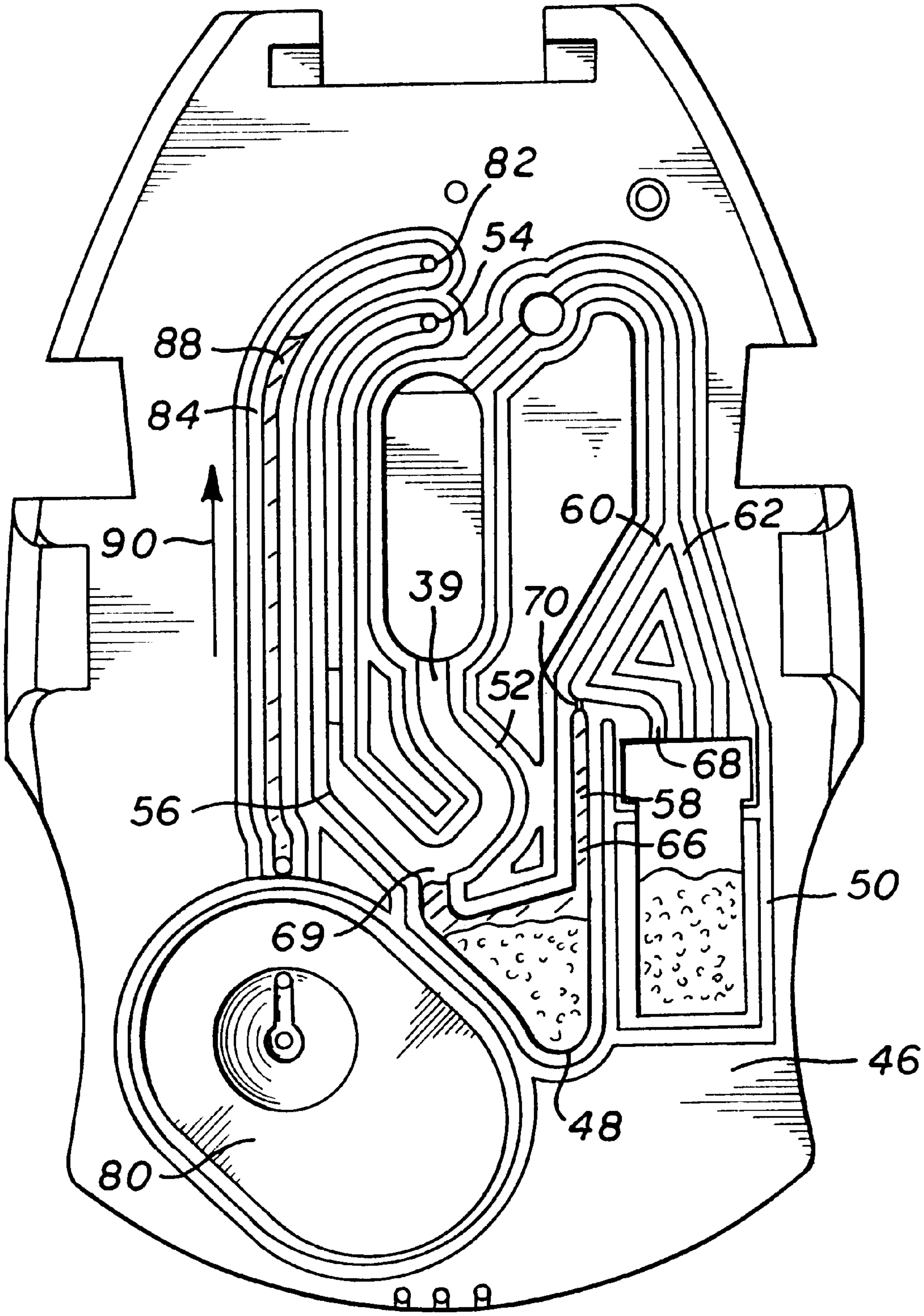
FIG. 7 is a view of the cartridge body depicting the transfer of reagent from the reagent well to the test well (cuvette).

In many spectrophotometric analysis protocols, it is desirable to add a reagent to the cuvette either before or after introduction of the test sample. In the preferred embodiment of the present invention, a reagent well or pouch is located in the cartridge as shown at 80 in FIGS. 1, 3–7 and 13. The reagent well is connected to the test well or cuvette inlet 82 by way of reagent passageway 84. A flexible pouch 86 (see FIGS. 1 and 3) is placed in the reagent well 80. As shown in FIG. 7, application of pressure to the flexible pouch 86 results in reagent, as shown at 88 being transported to the test well inlet 82, as represented by arrow 90. Referring to FIG. 13, it is preferred that the bottom of the reagent pouch 86 be pierced by spike 94 when the pouch 86 is depressed. Upon puncture of layer 92 by spike 94, the reagent flows into channel 96 and then into reagent passage 84 as represented by arrow 98. Other types of valving systems are possible. However, the use of a foil or other material which can be punctured by spike 94 is preferred due to its simplicity. As was the case with flexible septum 20, it is preferred that the pouch 86 be automatically depressed or squeezed by a mechanical arm or other device at an appropriate time during the analysis protocol.

The cartridge assembly, as described above, is well-suited for conducting a number of different spectrophotometric analyses including coagulation, immunochemistry and chemistry tests. A wide variety of fluids, including serum, plasma, whole blood, saliva, spinal fluid, urine or water may be tested. Detection of a signal from the prismatic cuvette can be achieved by using electromagnetic radiation such as ultraviolet, visible or infra red light.

Examples of coagulation tests that can be measured in the prismatic cuvette are prothrombin time, activated partial thromboplastin time, fibrinogen and thrombin time. The coagulation event can be measured optically by detecting a change in the turbidity of the sample using an analytical instrument. Turbidity is the measure of the decrease in light passing through a sample due to light scatter, reflectance and absorption.

Immunochemistry tests can be performed in the prismatic cuvette using either light absorption or turbidity techniques. Using light absorption, a technique such as enzyme multiplied immunoassay technique (EMIT) can be used to optically measure small molecules in solution. Examples of analytes that can be measured by EMIT include digoxin, theophylline, phenytoin, thyroxine, valproic acid, gentamicin, tobramycin and cyclosporin. Using turbidity, techniques such as microparticle agglutination inhibition and direct microparticle agglutination can be used to measure large and small molecules. Examples of analytes that can be measured using the agglutination principle include digoxin, thcophylline, phenytoin, thyroxine, valproic acid, gentamicin, tobramycin, cyclosporin, human chorionic gonadotrophin, troponin, myoglobin, prostate specific antigen, microalbumin and thyroid stimulating hormone.

Chemistry tests can be performed in the prismatic cuvette by adding all necessary reagents to perform the test to the cuvette and optically measuring the rate or endpoint of the chemical reaction. Some examples of chemistry tests that can be performed in the prismatic cuvette include lactic acid, ethanol, iron, iron binding capacity, glucose, cholesterol, carbon dioxide and lipase.

Raised ribs 240 and 242 as shown in FIGS. 10–12, are located on the bottom of the cuvette cell 228 in order to provide locations where various reagents may be pre-applied to the cuvette. In many determinations it is desirable to place one or more reagents into the cuvette prior to introduction of the sample fluid. The raised ribs 240 and 242 allow one to add up to four different reagent solutions which are then dried to provide separate reagent aliquots in the cuvette.

Having thus described exemplary embodiments of the present invention, it should be noted by those skilled in the art that the within disclosures are exemplary only and that various other alternatives, adaptations and modifications may be made within the scope of the present invention. For example, a stirring mechanism can be included within the cuvette, if desired. Accordingly, the present invention is not limited to the specific embodiments as illustrated herein, but is only limited by the following claims.

What is claimed is:

1. An analytical cartridge adapted for use in spectrophotometric analysis, said cartridge comprising:

a housing comprising a cartridge body which has a top surface, bottom surface and outer walls defining a housing perimeter, said body further comprising an inner end and an outer end;

a deposition well located in said cartridge body for receiving fluid to be analyzed, said deposition well having an inlet and an outlet:

a test well located in said cartridge body, said test well comprising a cuvette and an inlet through which fluid can be introduced into said cuvette, wherein said test well inlet is located more towards said cartridge body inner end than the outlet from said deposition well;

an overflow well located in said cartridge body, said overflow well having an inlet and an outlet, wherein said overflow well is located at a position which is more towards said outer end than said deposition well or said test well inlet;

a first passageway which connects the deposition well outlet to the overflow well inlet;

a second passageway which connects the deposition well outlet to the test well inlet wherein said first and second passageways are integral with each other at said deposition well outlet; and a pressurization device associated with said deposition well for pressurizing said deposition well to provide controlled movement of liquid through said second passageway.

2. An analytical cartridge according to claim 1 further comprises:

a reagent well for housing a liquid reagent, said reagent well having an outlet;

a reagent passageway which connects said reagent well outlet to said test well inlet; and a pressurization device associated with said reagent well for pressurizing said reagent well to provide controlled movement of reagent from said reagent well to said test well.

3. An analytical cartridge according to claim 1 wherein said first passageway comprises a separation well which is located in said cartridge body at a position which is more towards said outer end than said deposition well, said separation well including an inlet connected to said deposition well outlet and an outlet connected to said overflow well inlet.

4. An analytical cartridge according to claim 1 wherein said pressurization device comprises a flexible septum which can be moved from a relaxed position to one or more compressed positions, wherein movement from said relaxed position to said one or more compressed positions provides pressurization of said deposition well.

5. An analytical cartridge according to claim 4 wherein said septum is located in a cap, said cap being movable between an open position wherein said septum is displaced away from said deposition well to allow introduction of fluid into said deposition well and a closed position wherein said septum is in a position to provided pressurization of said deposition well.

6. An analytical cartridge according to claim 1 wherein said cuvette comprises:

a cuvette body having a bottom, a first wall and a second wall which define a cell, said first and second walls each including a radiation transparent zone wherein radiation may be passed through said first wall, said cell and said second wall, said first and second walls extending substantially perpendicular to said bottom;

a first wing extending from said first wall for receiving incident radiation which is directed substantially parallel to said first wall, wherein said first wing directs said incident radiation into said cell through said transparent zone in said first wall to form a test beam of radiation within said cell; and a second wing extending from said second wall for receiving said test beam of radiation which has passed through said cell and said transparent zone in said second wall, said second wing directing said test beam of radiation in a direction which is substantially parallel to said second wall and substantially in the opposite direction of said incident radiation.

7. An analytical cartridge according to claim 6 wherein said first wall has a first surface area and said second wall has a second surface area, said transparent zone in said first wall having a surface area which is substantially equal to the surface area of said first wall.

8. An analytical cartridge according to claim 7 wherein said transparent zone in said second wall has a surface area which is substantially equal to the surface area of said second wall.

9. An analytical cartridge according to claim 6 wherein said first wing comprises a reflective face which directs said incident radiation to said first wall.

10. An analytical cartridge according to claim 9 wherein said second wing comprises a reflective face which directs said test beam of radiation in a direction which is substantially parallel to said second face and in the opposite direction of said incident radiation.

11. An analytical cartridge according to claim 6 wherein said first wing is a solid radiation transparent body.

12. An analytical cartridge according to claim 6 wherein said second wing is a solid radiation transparent body.

13. An analytical cartridge according to claim 11 wherein said second wing is a solid radiation transparent body.

14. A cuvette adapted for use in measuring radiation transmission through liquid samples, said cuvette comprising:

a cuvette body having a bottom, a first wall and a second wall which define a cell, said first and second walls each including a radiation transparent zone wherein radiation may be passed through said first wall, said cell and said second wall, said first and second walls extending substantially perpendicular to said bottom;

a first wing extending from said first wall for receiving incident radiation which is directed substantially parallel to said first wall, wherein said first wing directs said incident radiation into said cell through said transparent zone in said first wall to form a test beam of radiation within said cell; and a second wing extending from said second wall for receiving said test beam of radiation which has passed through said cell and said transparent zone in said second wall, said second wing directing said test beam of radiation in a direction which is substantially parallel to said second wall and substantially in the opposite direction of said incident radiation.

15. A cuvette according to claim 14 wherein said first wall has a first surface area and said second wall has a second surface area, said transparent zone in said first wall having a surface area which is substantially equal to the surface area of said first wall.

16. A cuvette according to claim 15 wherein said transparent zone in said second wall has a surface area which is substantially equal to the surface area of said second wall.

17. A cuvette according to claim 14 wherein said first wing comprises a reflective face which directs said incident radiation to said first wall.

18. A cuvette according to claim 17 wherein said second wing comprises a reflective face which directs said test beam of radiation in a direction which is substantially parallel to said second face and in the opposite direction of said incident radiation.

19. A cuvette according to claim 14 wherein said first wing is a solid radiation transparent body.

20. A cuvette according to claim 14 wherein said second wing is a solid radiation transparent body.

21. A cuvette according to claim 20 wherein said second wing is a solid radiation transparent body.

22. A method for analyzing a fluid which comprises the steps of:

a) introducing said fluid into an analytical cartridge wherein said cartridge comprises:

a housing comprising a cartridge body which has a top surface, bottom surface and outer walls defining a housing perimeter, said body further comprising an inner end and an outer end;

a deposition well located in said cartridge body for receiving fluid to be analyzed, said deposition well having an inlet and an outlet:

a test well located in said cartridge body, said test well comprising a cuvette and an inlet through which fluid can be introduced into said cuvette, wherein said test well inlet is located more towards said cartridge body inner end than the outlet from said deposition well;

an overflow well located in said cartridge body, said overflow well having an inlet and an outlet, wherein said overflow well is located at a position which is more towards said outer end than said deposition well or said test well inlet;

a first passageway which connects the deposition well outlet to the overflow well inlet;

a second passageway which connects the deposition well outlet to the test well inlet wherein said first and second passageways are integral with each other at said deposition well outlet; and a pressurization device associated with said deposition well for pressurizing said deposition well to provide controlled movement of liquid through said second passageway;

b) centrifuging said analytical cartridge with said inner end and outer end of said cartridge body oriented so that said fluid flows from said deposition well into said first and second passageways;

c) pressurizing said test well to provide flow of fluid from said first and second passageways into said cuvette; and d) analyzing said fluid in said cuvette.

23. A method according to claim 22 wherein said first passageway comprises a separation well which is located in said cartridge body at a position which is more towards said outer end than said deposition well, said separation well including an inlet connected to said deposition well outlet and an outlet connected to said overflow well inlet, said cartridge being centrifuged for a sufficient time and at a sufficient centrifugal force to separate any solid components from said fluid into a solids fraction located in said separation well to thereby provide substantially solids-free liquid located in said second passageway and the portion of said first passageway which is integral with said second passageway.

24. A method according to claim 23 wherein said fluid is blood, said blood being separated during said centrifuging step into a cell fraction located in said separation well and a cell-free fluid which is analyzed in said test well.

25. A method according to claim 22 which includes the additional step of adding a reagent to said fluid in said test well.

26. A method according to claim 23 which includes the additional step of adding a reagent to said cell-free fluid in said test well.

* * * * *